United States Patent [19]

Barroso

[11] 4,313,630
[45] Feb. 2, 1982

[54] METHOD AND APPARATUS FOR KNOTTING AUTOMATICALLY MOUTHS OF FLEXIBLE PACKAGINGS

[76] Inventor: Angel L. Barroso, Ronda Carlos III, s.n., Martaro (Barcelona), Spain

[21] Appl. No.: 87,792

[22] Filed: Oct. 24, 1979

[30] Foreign Application Priority Data

Oct. 31, 1978 [ES] Spain .................................. 475.086

[51] Int. Cl.³ ...................... B65H 69/04; A01D 59/04
[52] U.S. Cl. .......................................... 289/1.5; 289/2; 289/18.1
[58] Field of Search ........................... 289/1.5, 2, 18.1

[56] References Cited

U.S. PATENT DOCUMENTS

| | | | |
|---|---|---|---|
| 2,462,957 | 3/1949 | Gunn | 289/2 X |
| 2,517,461 | 8/1950 | Carlile | 289/18.1 |
| 2,913,270 | 11/1959 | Sachsenröder et al. | 289/2 |
| 3,940,169 | 2/1976 | Kock | 289/1.5 |
| 4,008,912 | 2/1977 | Kotov | 289/1.5 X |
| 4,188,053 | 2/1980 | Pujol | 289/18.1 |

FOREIGN PATENT DOCUMENTS 142166  4/1961  U.S.S.R. ................................ 289/2

Primary Examiner—Louis Rimrodt
Attorney, Agent, or Firm—Cushman, Darby & Cushman

[57] ABSTRACT

A method and apparatus for knotting flexible packages especially suited to knotting filled sausage casings, in which a loop of string is positioned adjacent to the area of the package to be knotted, and one end of the loop is drawn around the package and through the loop itself, and then pulled tightly, thus knotting the string around the package.

14 Claims, 17 Drawing Figures

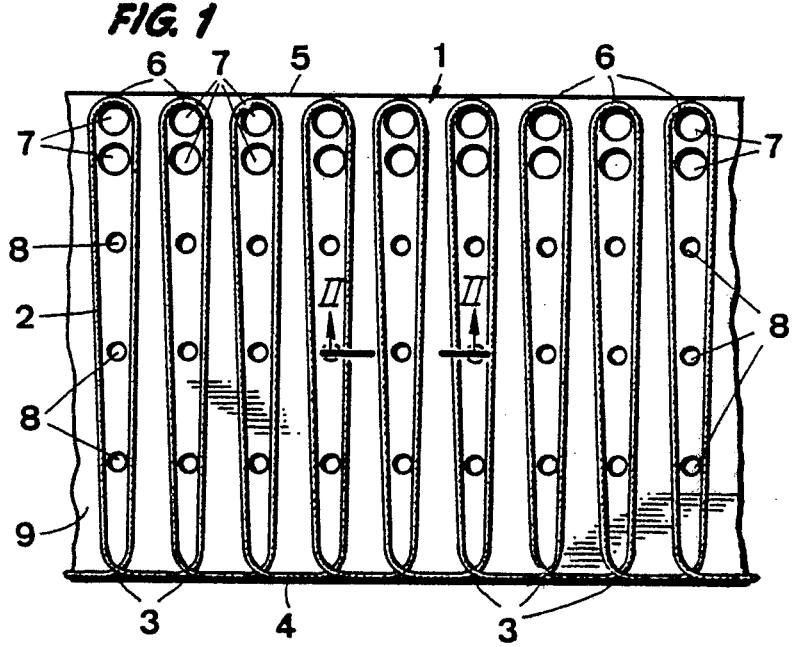
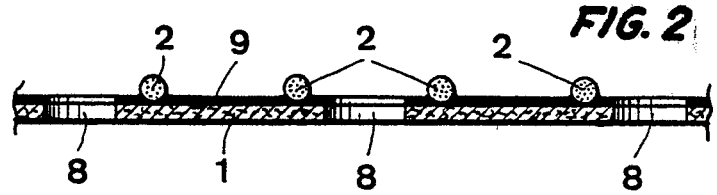

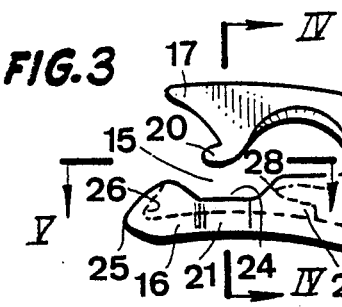
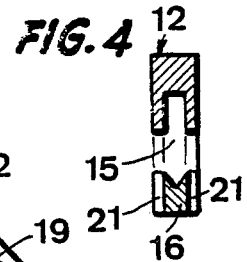
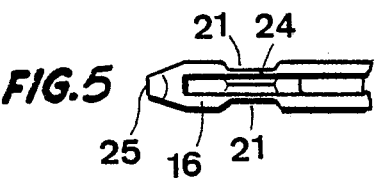
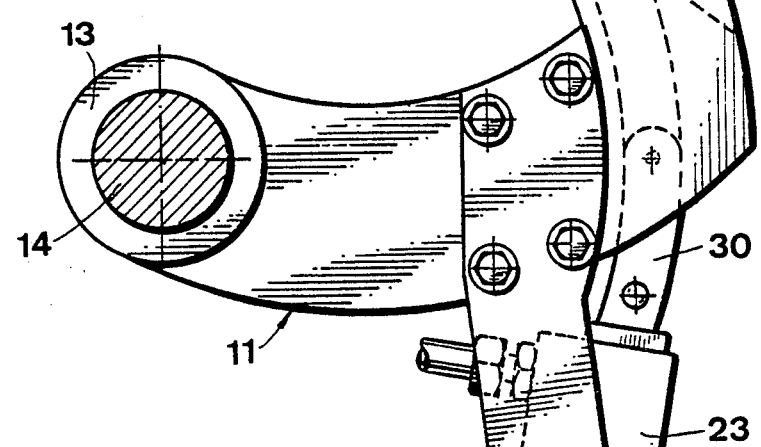
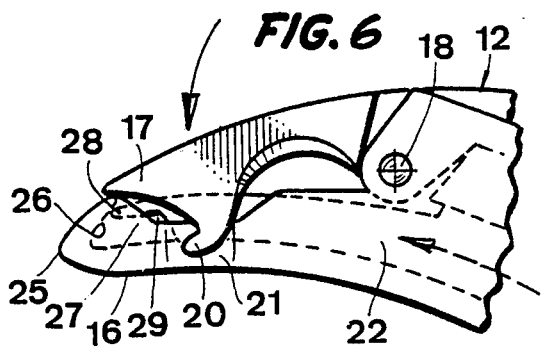

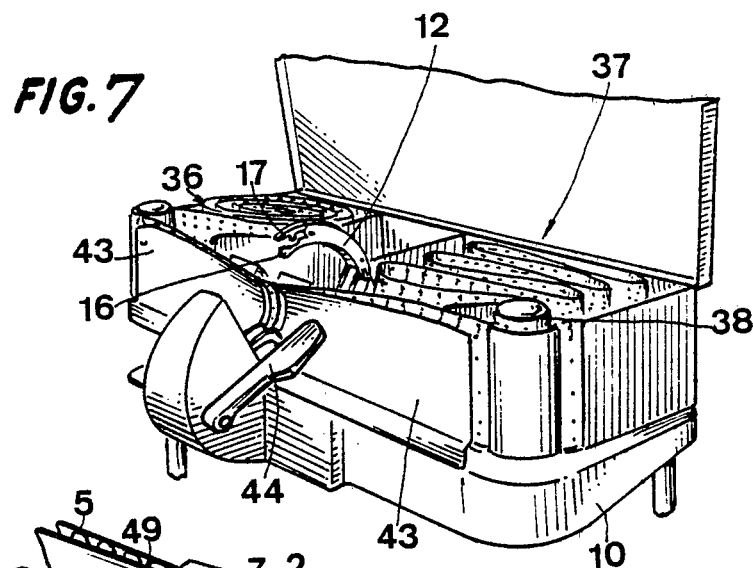
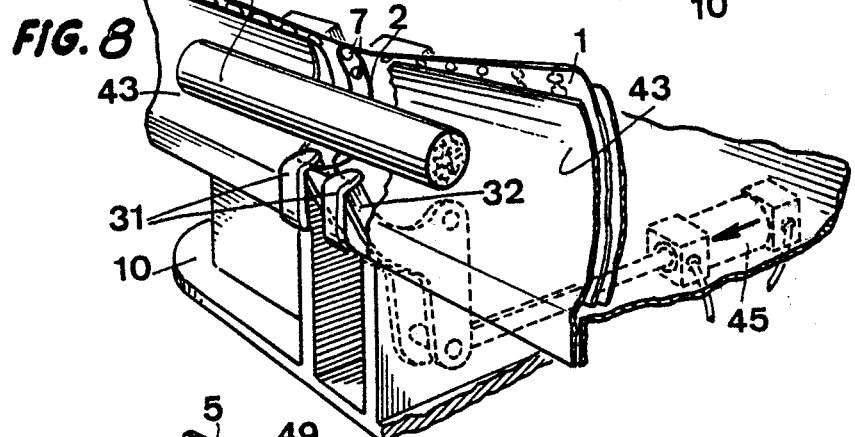
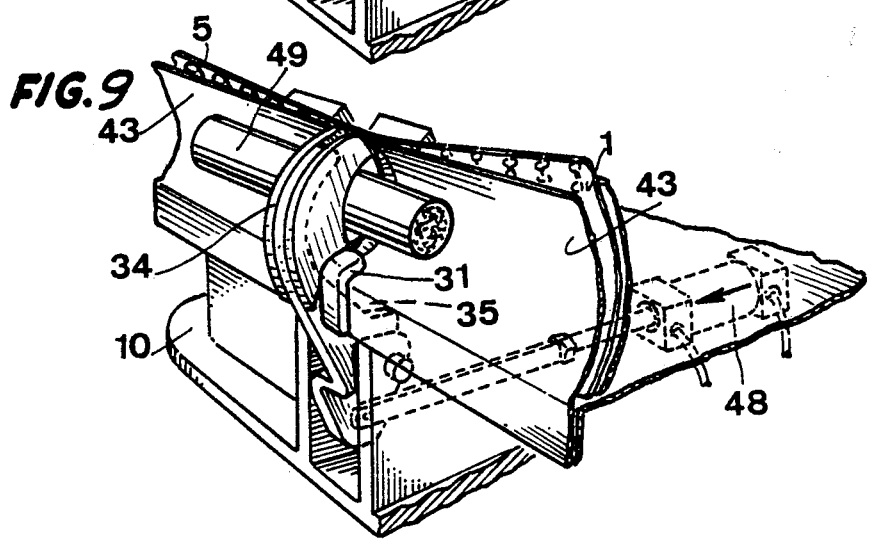

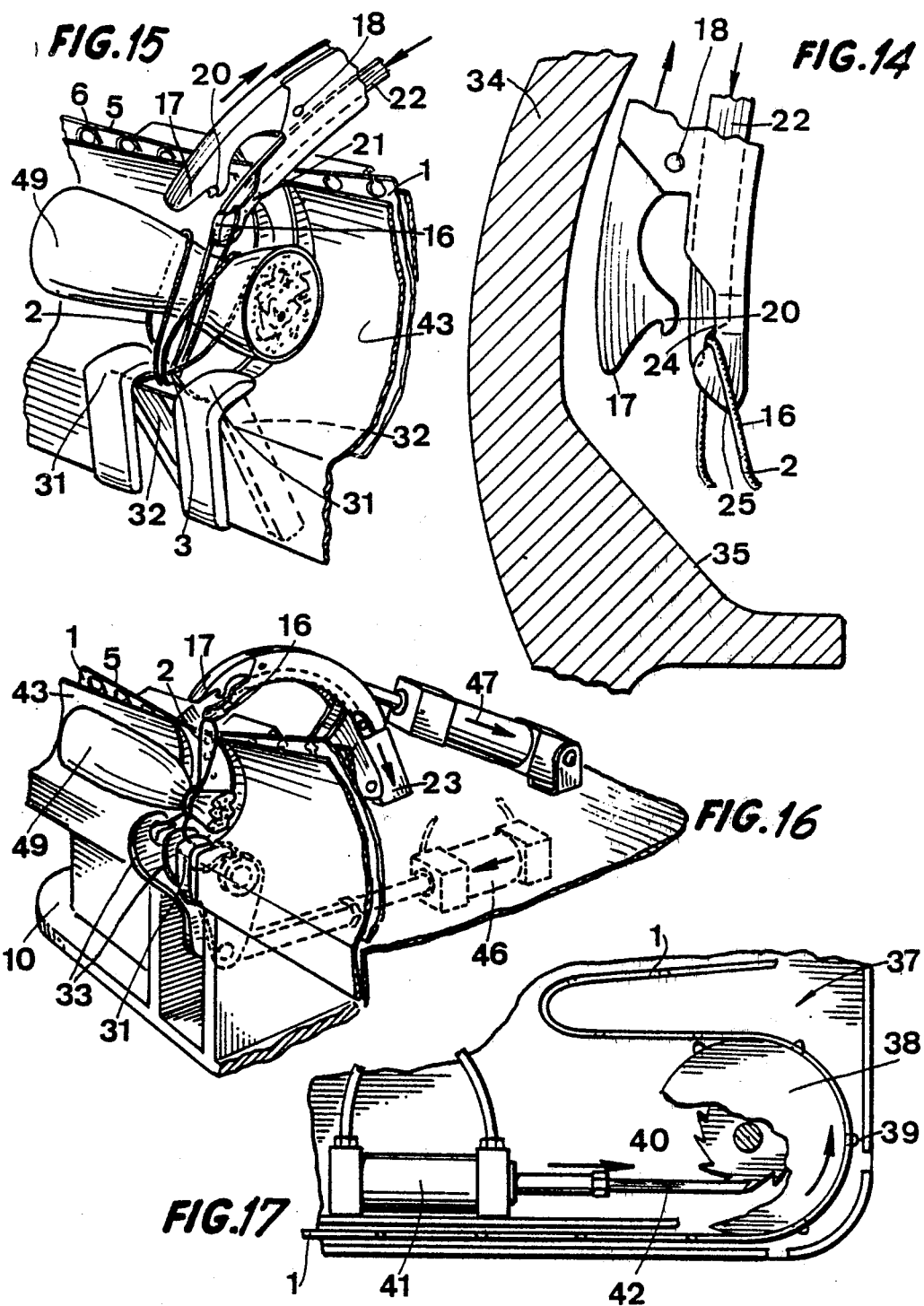

METHOD AND APPARATUS FOR KNOTTING AUTOMATICALLY MOUTHS OF FLEXIBLE PACKAGINGS

The subject invention refers to a method and an apparatus for knotting automatically mouths of flexible packagings, particularly applicable in the knotting of tripe for sausages.

The knotting systems known up to the present for the tying up of sausages and similar products do not completely satisfy the industrial needs, inasmuch as it frequently happens that, in tightening the knot which strangles the sausage, the tripe is cut or damaged, be it natural or artificial, and at the same time, the greater part of the remaining bindings require a second knot to allow the hanging of the sausages.

In almost all cases, the knotting is practically done by hand, with the consequent slowness and the most notable incidence of the labor cost in each knotting.

In Patent of Invention No. 295,446, conceded in favor of the applicant himself, a process is described for the mechanical knotting of sausages and similar ones which, although it substantially improves the productivity obtained through the knotting by hand, turns out to be an improvement halfways only of the problem posed by the knotting of sausage tripe, since it only allows knotting in its empty part and, moreover, it is necessary to use a complex mechanical apparatus, of a rather low performance.

By means of the method and apparatus of the subject invention, the yield of the knotting operation is notably increased, and the failures practically eliminated by having simplified the concept of the apparatus necessary in carrying out the method in question.

In essence, said method is consists of positioning an arranged string forming a closed oblong loop, with the extreme ends of the loop superimposed in the shape of a cross, in such a way that said loop preferably adopt an arched position. The area of the packaging that has to be knotted is placed transversely in the concavity formed by the arched loop and the extreme ends of the string are held tightly. The part of the loop counter to the cross is taken and made to completely encircle the part of the packaging on which the knotting is to be done, passing it on the outside of the crossing and inserting it then inside the loop itself, and pulling at it until the string becomes tightly knotted around the flexible packaging.

The other characteristics and advantages of the method and apparatus of the subject invention will become apparent from the description given, below in relation to the attached drawings which illustrate, as a non-limitative example, a manner of accomplishing same.

FIG. 1 shows an elevational view of part of a load roll;

FIG. 2 is a sectional view, at a very amplified scale, according to II—II of FIG. 1;

FIG. 3 illustrates an elevational view of a transference device with which the apparatus, which is the purpose of the invention, is equipped, partially cross-split;

FIG. 4 shows a sectional view, according to IV—IV of FIG. 3;

FIG. 5 is a detail, according to V—V of FIG. 1;

FIG. 6 illustrates a detailed view, in lateral elevation, of the mouth of the transference device in locked position;

FIG. 7 represents a perspective view of the apparatus dealt with, uncovered and in rest position;

FIGS. 8 to 16 are various views of the different stages of the process, with the parts of the machine that could hamper a clear appraisal of said process having been eliminated in each figure; and FIG. 17 is a plan view of the dragging member of the load roll.

Figure 10:
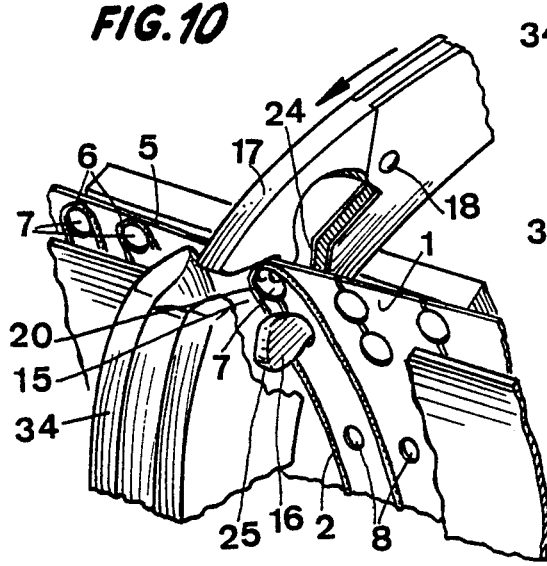

In said drawings it can be appraised that the string 2 is incorporated into the process in load rolls composed of a support 1 of a laminar band of paper, on one face of which the string 2 is arranged, without any interruption of continuity in multiple adjacent and transversal oblong loops, as can be appraised in FIGS. 1 and 2 of the drawings.

The crossings 3 determined by the ends of each loop, superimposed between themselves, are very close to one of the edges 4 of the supporting band 1, and the parts opposite the crossings 3 are tangent to the second edge 5 of the band 1.

Transversely aligned inside each loop are two holes 7, cut very close to the edge 5, and other holes 8, in the preferred embodiment in threes, separated one from the other and smaller than holes 7 also transversally aligned and assigned to the dragging of the load roll.

The face of the laminar band 1 which supports the string 2 is provided with a plastic material coating 9, onto which the string 2 is adhered by the thermofusion of said plastic material.

The apparatus for the execution of the described method consists of a framing 10 on which are mounted a transference device of the string; two pairs of nippers 31 and 32 for holding the ends of the string 2; two cutters 33 for cutting the string 2; a lower lock piece 34, provided with an inclined plane 35 assigned to collaborate with the transference device; a deposit 36 containing the load roll; a deposit 37 containing the used load, already devoid of the string; a dragging member of the load roll; a curved positioner 43 of the load roll; a drive pulsator 44; and some driving members.

The cited transference device is comprised of a part in an angular shape, with its curved arms 11 and 12, at the end of the first of which 11 is a sleeve 13 adapted for fastening to a rotating shaft 14, likely to, on driving the pulsator 44, rotate in each work cycle at an angle ranging between 90° and 100° and then return to its initial rest position.

The second arm 12, or operating arm, is curved, with a arc of approximately 90° and, at its free end, is equipped with a mouth 15 consisting of a fixed lower jaw 16 and a moveable upper jaw 17 articulated in the internal point 18 of the mouth 15.

Said moveable upper jaw 17 is designed to close on the fixed jaw 16 when its free end is brought against the cited inclined plane 35 of the lower locking piece 34 when the cited shaft 14 rotates, accomplishing a transference movement, with the said upper jaw 17 held in an open position, when its free end is separated from said inclined plane 35 by a draft spring 19, which pulls on the internal part, and with the upper jaw 17 equipped with a pair of internal, parallel, short lower catches 20, facing forwards and adapted for dragging the string 2.

The load is so arranged that, when the shaft rotates and with it, the angular part, the front end 25 of the lower jaw 16 goes over the lower hole of the pair of larger holes 7 cut on the backing paper 1 of the string 2, while the catches 20 of the upper jaw 17 go over the upper hole of the pair of holes 7, and the end of the upper jaw 17 goes on the outside of the edge 5 of the backing paper 1, (FIG. 10), and when the upper jaw 17 closes on the fixed lower jaw 16 (FIG. 12), the catches 20 on both sides of it remain lodged in various lateral entrants 21, still dragging the string 2.

The cited operating arm 12 is hollow and, in its interior, it is fitted with a longitudinally-shiftable bar 22, correspondingly arched, projecting from the joining vertex of both arms 11 and 12 and provided with a seesaw alternating motion, controlled by a driving member 23 which acts on the part of the bar 30 projecting from the joining vertex of both arms 11 and 12.

The lower jaw 16 is hollow, has its internal face open, its internal corners equipped with various entrant grooves 24 and its front end 25 terminating in a point and locked by an inclined plane 26 inwards.

The bar is equipped at its front end with an internal lower groove 27, so that in the extreme position of displacement outwards of the bar 22, whereby its front end becomes inserted under the inclined plane 26 (FIGS. 6 and 13), a small through space 29 is left between the lower part of the bar 22 and the upper corner of the grooves 27, all this so that when the bar 22 shifts forwards, it drags with its lower groove 27 the string 2 which remains firmly held in the cited through space 29.

The driving member 23 which acts on the bar 22 consists chiefly of a pneumatic cylinder.

Figure 11:
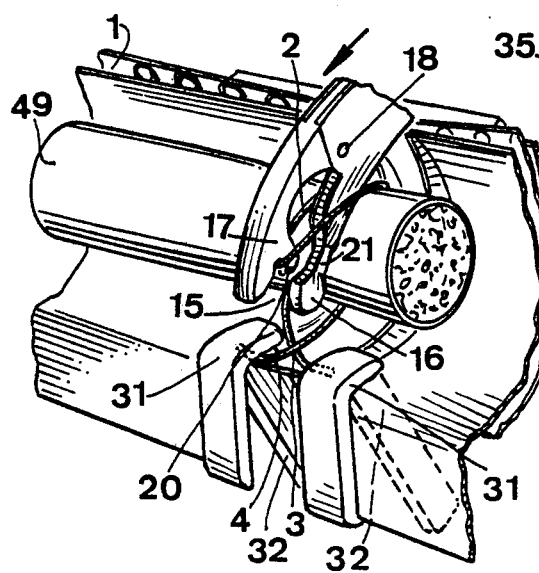

Each pair of the holding nippers of the string 2 consists of a fixed upper part 31 and a moveable lower part 32, likely to come near the upper part 31 and press against it at a corresponding end of the string 2 (FIGS. 8, 11 and 15), holding it firmly, with said moveable lower part 32 driven by a respective driving member, consisting chiefly of a pneumatic cylinder 45 (FIG. 8).

Each one of the cutters 33 of the string 2 is arranged in a vertical plane and operates by shearing in collaboration with the adjacent vertical corner of one of the holding nippers 31 of the string 2, said cutters 33 driven by a common driving member which consists of a pneumatic cylinder 46 (FIG. 16).

On its part, the rotating shaft 14 which moves the transference device, is driven by a pneumatic cylinder 47 (FIG. 16).

Figure 12:
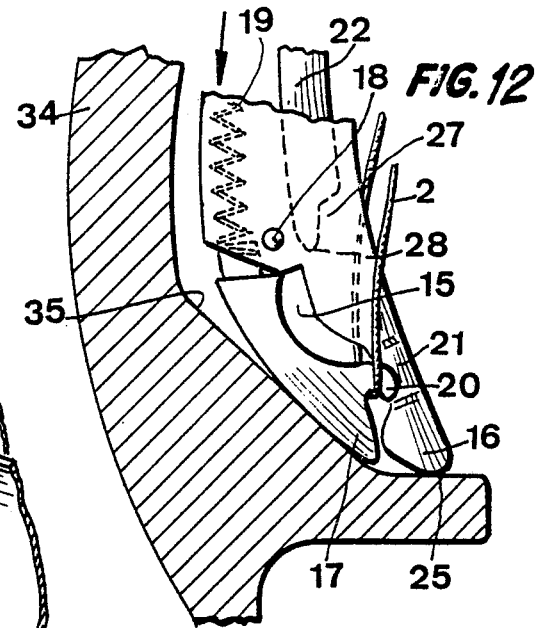
Figure 13:
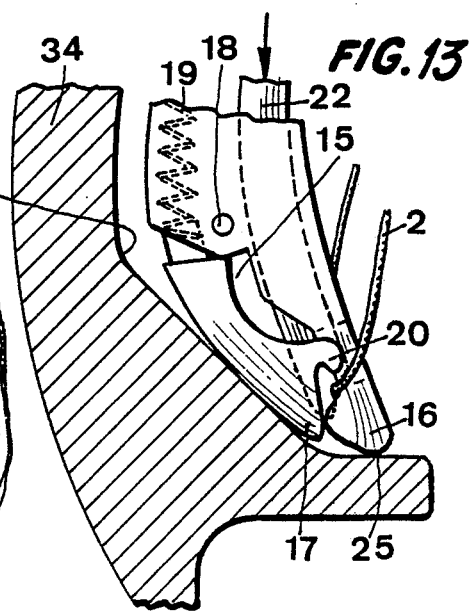

The operating process of the apparatus is as follows: The load roll is inserted in the deposit 36, goes through the curved, positioner 43 up to the dragging member of the load roll, composed of a drum 38 (FIGS. 7 and 17), provided with small active catches 39 and a toothed wheel 40, integral with its own axle, thus being forced to rotate angularly in each cycle on one same angle through the action of a pneumatic cylinder 41 provided with a piston rod 42, integral with a piston which acts, in each cycle, on one of the catches of the toothed wheel 40. With a loop of the string 2 placed in an operating position and upon acting on the pulsator 44, the pneumatic cylinder 45 is driven, which forces the nippers 32 to hold the ends of the string strongly, near the cross 3 and, at the same time, the cylinder 47 is also driven, which forces the transference device to shift forwards angularly, and the pneumatic cylinder 48 as well, which acts and makes the locking piece 34 encircle the sausage 49 on its front surface. The transference device takes the upper part of the string 2, separating it from the support 1 (FIG. 10), makes it go around the sausage, continues descending downwards, outside of the cross 3 (FIG. 11), until said cross 3 is inserted at the bottom of the mouth 15, then the transference movement is carried out, as shown in FIGS. 12 and 13, where the string which forms the cross 3 has not been drawn for a greater clarity of the drawings, although it must be stated that said cross 3 remains inside the mouth 15 in the position shown in FIGS. 12 and 13 of the drawings. With the string tightly held by the bar 22 and the lower jaw 16, the transference device then receives direction (FIGS. 14 and 15), so that the string completely encircles the sausage 49, is reinserted inside the loop itself and, through the traction carried out by the operating arm 12, it reaches the position illustrated in FIG. 16, where the knot has been completely done.

Optionally, the apparatus can be equipped with an automatic cutting device of the sausage tripe, and with a positioner arrester for regulating the length of the sausage, not shown.

I claim:

1. A method of automatically knotting flexible packages comprising:
    entering a string on a support in the form of a plurality of adjacent closed loops, each with its ends crossed;
    placing the area of the package to be knotted across one of the loops;
    tightly grasping said one loop at the loop segment directly across from and farthest from the crossed ends of the one loop;
    moving said loop segment in an arc about said package so that the path of the said segment encircles said area to be knotted of the package;
    inserting said loop segment through the one loop itself;
    pulling said loop segment until the string becomes tightly knotted around the rear to be knotted; and
    cutting said ends of said loop.

2. A method as claimed in claim 1, wherein said string is incorporated into the process in load rolls composed of a support of a laminar band of paper, on one face of which the string is arranged without any interruption of continuity, in multiple adjacent and transverse oblong loops, where the crosses are very close to one of the edges of the support band and the parts opposite the crosses are arranged approximately tangent to the second edge of the band, with two transversely aligned holes cut inside each loop, very closely to the second edge, and other spaced dragging holes, smaller, and also transversely aligned.

3. A method as claimed in claim 1, wherein the face of the said laminar band which supports the string is coated with a plastic material, onto which the string is later affixed by the thermofusion of said plastic material.

4. An apparatus for automatically knotting flexible packages comprising:
    a frame;
    means in said frame for storing a load roll, said load roll consisting of a laminar sheet having a string in a pattern of adjacent closed loops affixed thereto;
    dragging means attached to said frame for unwinding said load roll from said storing means;
    curved positioning means attached to said frame for positioning said load roll in an arched position as it is unwound from said storing means by said dragging means;

nipping means attached to said frame for securing the ends of one of said adjacent closed loops affixed to the load roll;

transference means attached to said frame having upper jaw means for hooking the loop segment of said closed loop farthest from said ends secured in said nipping means and separating said loop segment from said laminar sheet and describing an arc about the package and lower jaw means for receiving said segment from said upper jaw and pulling said loop segment through the loop;

lower locking means attached to said frame for guiding said transference means and forcing said upper jaw means against said lower jaw means, thus effecting a transfer of the loop segment;

means attached to said frame for cutting said ends of said loop;

pulsating drive means attached to said frame for driving said dragging means, nipping means, transference means and cutting means;

means in said frame for storing said load roll already stripped of string by said transference means.

5. An apparatus as claimed in claim 4, wherein said transference means comprises a part of angular shape, with curved arms, at the end of the first of which is a sleeve adapted for fastening to a rotating shaft, designed to, on driving the pulsator, rotate in each work cycle through an angle not less than 90° and not greater than 100° and then return to its initial rest position, while the second arm, or operating arm is curved with an arc of approximately 90° and is equipped, at its free end, with a mouth consisting of a fixed lower jaw means and moveable upper jaw means articulated in the internal point in the mouth, designed to close on the lower jaw means when its free end bumps against an inclined plane of the lower lock means when said shaft rotates, accomplishing a transfer of the string from the upper to the lower jaw means, with the said upper jaw means held in an open position when its free end is separated from said inclined plane, by a draft spring which pulls on the internal part, and with the upper jaw means equipped with a pair of internal, parallel short lower catches, facing forwards and adapted for dragging the string, with the load so arranged that, when the shaft rotates, and with it, the angular part, the end of the lower jaw means goes over the lower hole of the pair of larger holes cut on the backing paper of the string, while the catches of the upper jaw means go over the upper hole, and the end of the upper jaw means goes on the outside of the edge of the backing paper, and when the upper jaw means closes on the fixed lower one, the catches on both sides of it remain lodged in various lateral entrants, still dragging the string.

6. An apparatus as claimed in claim 5 wherein said operating arm is hollow and, in its interior, is fitted with a longitudinally-shiftable bar, correspondingly arched, projecting from the joining vortex of both arms and driven in a seesaw alternating motion, controlled by a driving means which acts on the part of the bar projecting from the joining vertex of both arms.

7. An apparatus as claimed in claim 6 wherein the lower jaw means is hollow, has its internal face open, its internal corners equipped with various entrant grooves and its front end terminating in a point and locked by an inclined plane inwards.

8. An apparatus as claimed in claim 6, wherein the said said bar is equipped at its front end with an internal lower groove so that in the extreme position of displacement outwards of the bar, whereby its front end becomes inserted under the locking inclined plane of the corresponding front end of the lower jaw means, a small through space is left between the lower part of the bar and the uper corner of the grooves of the lower jaw means, so that when the bar shifts forward, it drags the string with its lower groove, and the string remains firmly held in the said through space.

9. An apparatus as claimed in claim 6, wherein the said driving means which acts on said bar consists chiefly of a pneumatic cylinder.

10. An apparatus as claimed in claim 5 wherein said rotating shaft which moves said transference means is driven by a pneumatic cylinder.

11. An apparatus as claimed in claim 1 wherein each pair of said nipping means consists of a fixed upper part and a moveable lower part, designed to move toward said upper part and press against it at a corresponding end of the string, holding the string tightly, with said moveable part driven by a respective driving means.

12. An apparatus as claimed in claim 11 wherein said driving means consists of a pneumatic cylinder.

13. An apparatus as claimed in claim 1 wherein said cutting means is arranged in a vertical plane and operates by shearing in cooperation with the adjacent vertical corner of one of the nipping means, said cutting means driven by a common driving means.

14. An apparatus as claimed in claim 13 wherein said driving means consists of a pneumatic cylinder.

* * * * *